United States Patent
Fukushima

(10) Patent No.: US 7,086,056 B2
(45) Date of Patent: Aug. 1, 2006

(54) PROCESSOR UNIT FOR EXECUTING EVENT PROCESSES IN REAL TIME WITHOUT CAUSING PROCESS INTERFERENCE

(75) Inventor: Toshiyuki Fukushima, Kariya (JP)

(73) Assignee: Denso Corporation, Kariya (JP)

( * ) Notice: Subject to any disclaimer, the term of this patent is extended or adjusted under 35 U.S.C. 154(b) by 700 days.

(21) Appl. No.: 10/097,834

(22) Filed: Mar. 15, 2002

(65) Prior Publication Data

US 2002/0133531 A1     Sep. 19, 2002

(30) Foreign Application Priority Data

Mar. 19, 2001    (JP)    ............................... 2001-78561

(51) Int. Cl.
| | |
|---|---|
| G06F 9/46 | (2006.01) |
| G06F 19/00 | (2006.01) |
| G06F 7/00 | (2006.01) |
| G06F 12/00 | (2006.01) |
| G06F 9/26 | (2006.01) |
| G06F 13/24 | (2006.01) |
| G01M 17/00 | (2006.01) |
| G06F 11/00 | (2006.01) |

(52) U.S. Cl. .................. 718/102; 701/35; 701/108; 701/110; 701/114; 711/121; 711/207; 710/56; 710/264; 710/267; 714/15; 700/245

(58) Field of Classification Search ........ 718/100–108; 719/319; 711/144–159, 121, 207; 710/40, 710/56–267; 700/245; 701/35–114; 714/15, 714/53

See application file for complete search history.

(56) References Cited

U.S. PATENT DOCUMENTS

| | | | | |
|---|---|---|---|---|
| 3,530,438 | A | * | 9/1970 | Nelson ........................ 718/100 |
| 4,126,893 | A | * | 11/1978 | Cronshaw et al. ............ 710/40 |
| 4,255,789 | A | * | 3/1981 | Hartford et al. ............ 701/108 |
| 4,615,001 | A | * | 9/1986 | Hudgins, Jr. ................. 718/102 |
| 4,758,948 | A | * | 7/1988 | May et al. ................... 718/102 |
| 4,805,095 | A | * | 2/1989 | Armstrong et al. ........... 714/15 |

(Continued)

FOREIGN PATENT DOCUMENTS

JP    5-224958    9/1993

(Continued)

OTHER PUBLICATIONS

Bortolazzi et al., "Specification and Design of Electronic Control Units", IEEE, 1996, pp. 1-6.*

(Continued)

*Primary Examiner*—Meng-Al T. An
*Assistant Examiner*—Jennifer N. To
(74) *Attorney, Agent, or Firm*—Nixon & Vanderhye P.C.

(57) ABSTRACT

A processor unit executes a failure detection program for a vehicle. The failure detection program includes a first failure detection process of a high priority level, a second failure detection process of a moderate priority level and a memory manipulation process of a low priority level. Each of the failure detection processes requests memory manipulation by generating an event as the need arises. When the memory manipulation process is activated, it performs the requested memory manipulation in the same order as the memory manipulation is requested so that execution of memory manipulation requested by one of the failure detection processes is not interrupted by execution of memory manipulation requested by the other of the failure detection processes. However, each of the failure detection processes itself can be executed interrupting the execution of memory manipulation process because of its higher priority level.

12 Claims, 4 Drawing Sheets

U.S. PATENT DOCUMENTS

| | | | | |
|---|---|---|---|---|
| 5,339,442 | A * | 8/1994 | Lippincott | 710/244 |
| 5,375,219 | A * | 12/1994 | Okabe | 711/147 |
| 5,491,631 | A * | 2/1996 | Shirane et al. | 701/35 |
| 5,566,334 | A * | 10/1996 | Loader | 718/100 |
| 5,615,375 | A * | 3/1997 | Ibusuki et al. | 710/264 |
| 5,832,205 | A * | 11/1998 | Kelly et al. | 714/53 |
| 5,903,752 | A * | 5/1999 | Dingwall et al. | 718/103 |
| 5,905,889 | A * | 5/1999 | Wilhelm, Jr. | 718/104 |
| 6,031,973 | A * | 2/2000 | Gomi et al. | 700/245 |
| 6,128,713 | A * | 10/2000 | Eisler et al. | 711/159 |
| 6,182,196 | B1 * | 1/2001 | DeRoo | 711/144 |
| 6,189,064 | B1 * | 2/2001 | MacInnis et al. | 710/244 |
| 6,199,152 | B1 * | 3/2001 | Kelly et al. | 711/207 |
| 6,208,930 | B1 * | 3/2001 | Uematsu | 701/110 |
| 6,233,630 | B1 * | 5/2001 | Wilhelm, Jr. | 710/56 |
| 6,301,634 | B1 * | 10/2001 | Gomi et al. | 710/267 |
| 6,349,361 | B1 * | 2/2002 | Altman et al. | 711/121 |
| 6,466,962 | B1 * | 10/2002 | Bollella | 718/107 |
| 6,691,023 | B1 * | 2/2004 | Fujino et al. | 701/114 |
| 6,772,419 | B1 * | 8/2004 | Sekiguchi et al. | 719/319 |
| 6,915,203 | B1 * | 7/2005 | Maegawa et al. | 701/114 |
| 2001/0049579 | A1 * | 12/2001 | Fujino et al. | 701/114 |

FOREIGN PATENT DOCUMENTS

| | | |
|---|---|---|
| JP | 5-289949 | * 11/1993 |
| JP | 11-96022 | 4/1999 |
| JP | 11-096022 | * 4/1999 |
| JP | 11-232148 | 8/1999 |
| JP | 2000-34948 | 2/2000 |

OTHER PUBLICATIONS

Dolev et la., "Toward a Non-Atomic Era: I-Exlusion as a Test Case", ACM, 1998, pp. 78-92.*

* cited by examiner

PROCESSOR UNIT FOR EXECUTING EVENT PROCESSES IN REAL TIME WITHOUT CAUSING PROCESS INTERFERENCE

CROSS REFERENCE TO RELATED APPLICATION

The present application is based on and incorporates herein by reference Japanese Patent Application No. 2001-78561 filed on Mar. 19, 2001.

BACKGROUND OF THE INVENTION

1. Field of the Invention

The present invention relates to a processor unit for executing a plurality of processes based on priority levels assigned to the processes.

2. Related Art

In an electronic control unit (ECU) installed in a vehicle, some processes included in its control program should be executed in real time for providing the sufficient responsiveness of control and a driver's safety. Accordingly, the control program includes a plurality of processes each of which is a run unit, and one of three priority levels is assigned to each of the processes. Specifically, the control program is composed of three tasks, that is, a high priority task, a moderate priority task, and a low priority task, and the processes are divided into the three tasks. The control program is executed switching among the tasks, so that higher priority processes are preferentially executed. Thus the high priority processes are executed in real time.

In this case, if processes that have the different priority levels manipulate the same memory area, these processes would interfere with one another as follows. Referring to FIG. 5, a process of lower priority reads one byte (eight bit) data "0000 0000" from the shared memory area at step A. Thereafter switching from the lower priority task to the higher priority task is performed, and a process of higher priority reads the one byte data "0000 0000" from the shared memory area at step C. Then the higher priority process manipulates the data "0000 0000" (i.e., set the least significant bit (LSB)), and writes the resultant data "0000 0001" to the shared memory area at step D. Thereafter the lower priority process manipulates the retrieved data "0000 0000" (i.e., set the second LSB), and writes the resultant data "0000 0010" to the shared memory area at step B. Thus the lower priority process overwrites or resets the LSB that has been set by the higher priority process.

Further, in the case that the lower priority process repeatedly reads data from the shared memory area, the data to be read by the lower priority process changes halfway if the higher priority process writes data to the shared memory area in between times.

The ECU usually has a self-diagnostic feature for automatically checking the operating state of computers and sensors included therein at appropriate intervals. If a failure is detected, information on the failure is stored so that the garage mechanic in charge can know the type of the failure.

The failure detection is performed for various sensors such as a crank angle sensor, a cam angle sensor, and a coolant temperature sensor. The subjects for failure detection number almost 200. Therefore, if memory areas are allocated for storing failure information corresponding to the respective subjects by the byte, the large amount of memory area is required in total. Accordingly it is preferable that memory areas are allocated by the bit for effective use of resources.

However, the ECU usually employs a reduced instruction set computer (RISC) which does not have a bit manipulation instruction. Therefore, in the ECU, memory areas are allocated for storing failure information by the bit, but memory manipulation is performed by the byte. Accordingly, there is every possibility that a plurality of processes manipulate the same memory area, and therefore there is every possibility that the processes interfere with one another.

Then, in order to overcome such interference, it is proposed that switching from the lower priority task to the higher priority task is inhibited while the lower priority process performs memory manipulation. In this case, all the higher priority processes are inhibited from being executed interrupting the execution of the lower priority process while the lower priority process performs the memory manipulation. That is, even higher priority processes that do not interfere with the lower priority process are inhibited from interrupting the execution of the lower priority process while the lower priority process performs the memory manipulation. Accordingly execution of high priority processes which should be executed in real time would be delayed, and therefore the sufficient responsiveness of control or a driver's safety is not ensured in this case.

SUMMARY OF THE INVENTION

The present invention has an object to prevent process interference without delaying execution of high priority processes in a processor unit in which processes of different priority levels manipulate the same memory area.

A processor unit according to the present invention includes a program to be executed for implementing a series of functions. The program includes a plurality of processes each of which is a run unit. Priority levels are assigned to the respective processes, and the processor unit executes the program switching among the processes based on the priority levels of the processes. Some processes of different priority levels manipulate the same memory area during execution of the program. The program includes a memory manipulation process for implementing memory manipulation as one of the processes. Each of the processes except the memory manipulation process requests memory manipulation by giving a memory manipulation instruction as the need arises, and the memory manipulation process performs the requested memory manipulation in response to the memory manipulation instruction when activated.

A specific priority level is assigned to the memory manipulation process so that execution of memory manipulation requested by a first process is not interrupted by execution of memory manipulation requested by a second process irrespective of the priority levels of the first and second processes. Preferably, the memory manipulation process performs the requested memory manipulation in the same order as it is requested.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
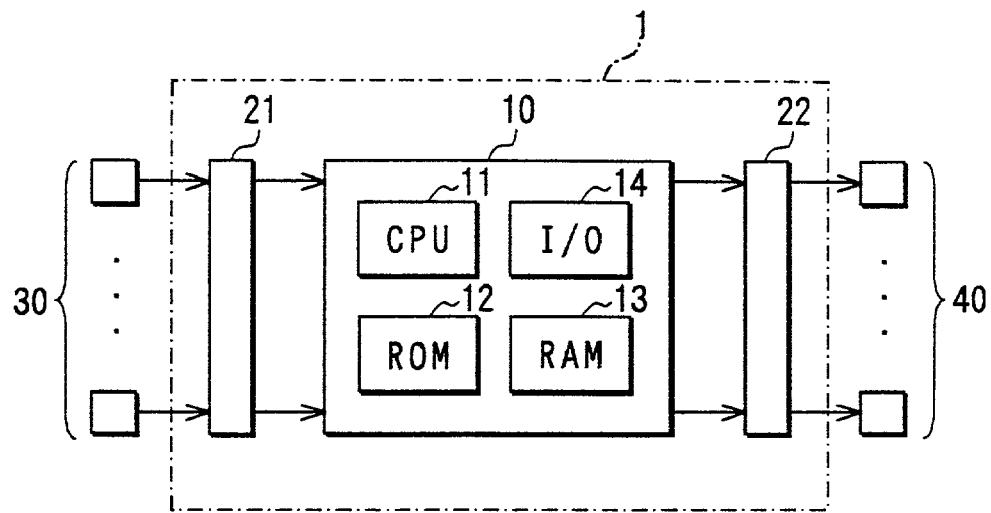
FIG. 1 is a block diagram showing a processor unit according to an embodiment of the present invention incorporated in a vehicle as an engine control unit.

A processor unit according to an embodiment of the present invention is incorporated in a vehicle as an engine control unit (ECU). The ECU controls an internal combustion engine installed in the vehicle. Referring to FIG. 1, the ECU 1 includes a microcomputer 10, an input circuit 21 and an output circuit 22. The input circuit 21 receives analog signals from various sensors 30 that detect the operating state of the engine. The sensors 30 include a crank angle sensor, a reference point sensor, a coolant temperature sensor, an oxygen sensor and the like.

The crank angle sensor generates a pulse signal whenever the crankshaft further turns for a predetermined angle. The reference point sensor generates a pulse signal whenever the piston of a specific cylinder reaches a predetermined point (e.g., TDC). The coolant temperature sensor detects the temperature of coolant. The oxygen sensor measures the oxygen concentration in exhaust gas. The input circuit 21 shapes the waveform of the received analog signals, and converts the shaped analog signals into digital signals. The resultant signals are outputted to the microcomputer 10.

The microcomputer 10 includes a CPU 11, ROM 12, RAM 13 and an I/O subsystem 14. The CPU 11 executes various programs based on the signals received from the input circuit 21 for controlling the engine. The ROM 12 stores the programs, which are executed by the CPU 11. The programs mainly include an engine control program. The RAM 13 stores the results of operations and the like during the execution of the programs.

The I/O subsystem 14 enables the microcomputer 10 to receive signals from the input circuit 21 and output signals to the output circuit 22. The microcomputer 10 further includes various registers, a free running counter and the like. The microcomputer 10 outputs control data as a result of the execution of the programs to the output circuit 22. The output circuit 22 drives actuators 40 installed in the engine in response to the control data received from the microcomputer 10. The actuators 40 include that for an injector (fuel injection system), that for an igniter (ignition device) and the like. Thus the ECU 1 controls the engine based on the signals from the sensors 30.

Figure 2:
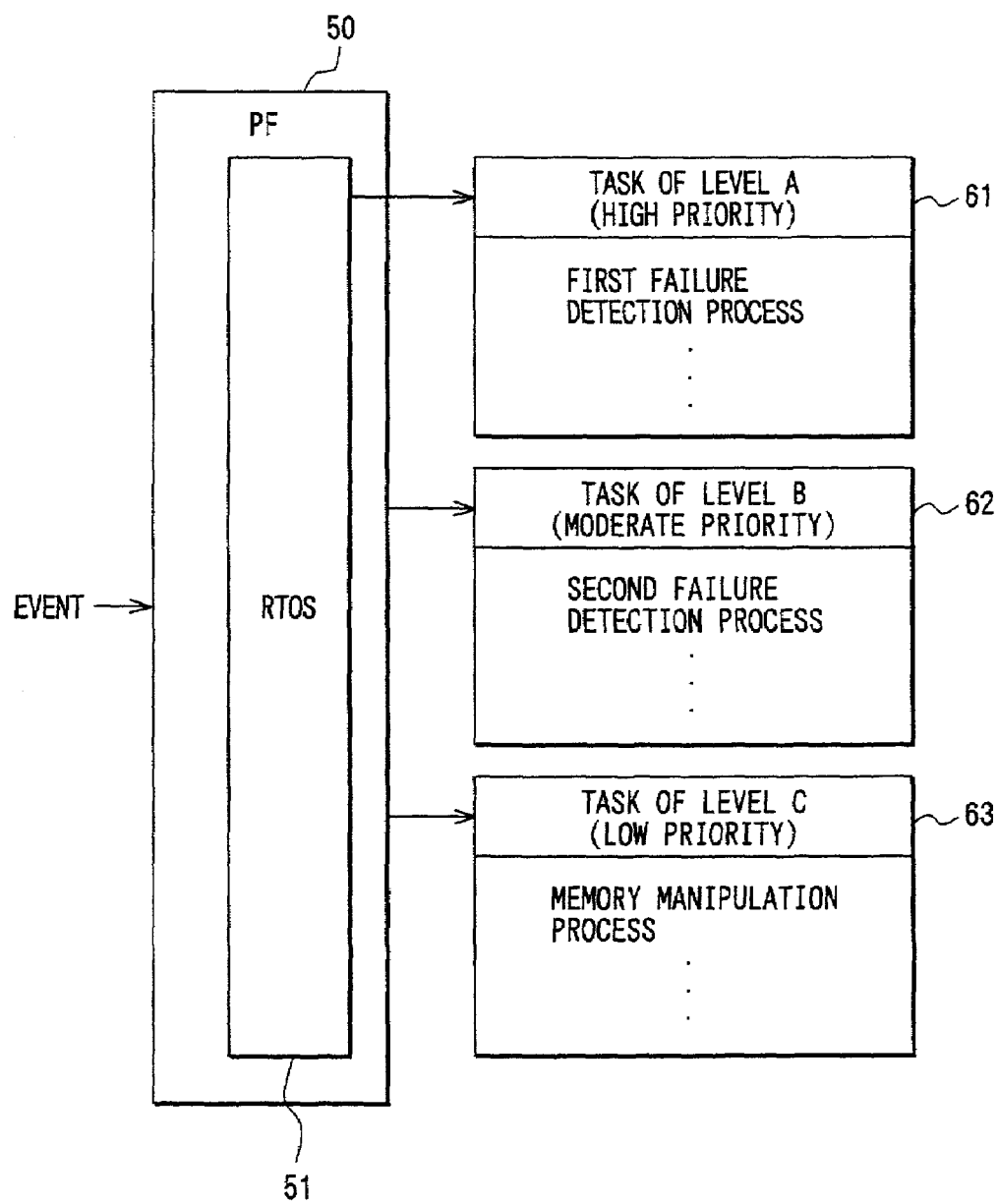
FIG. 2 is a block diagram showing an engine control program stored in the ROM of the processor unit.

Referring to FIG. 2, the engine control program includes a platform (PF) 50 and tasks 61, 62, 63. The PF 50 includes an RTOS 51 which executes the tasks 61, 62, 63 switching among the tasks 61, 62, 63. One of three different priority levels (task levels), that is, a high priority level A, a moderate priority level B, and a low priority level C is assigned to each of the tasks 61, 62, 63. Each of the tasks 61, 62, 63 includes a plurality of event processes each of which is a run unit. A task of a higher priority level is executed in preference to a task of a lower priority level.

The engine control program includes a failure detection program. The failure detection program includes three event processes, that is, a first failure detection process of level A, a second failure detection process of level B, and a memory manipulation process of level C. According to the assigned priority levels, as shown in FIG. 2, the first failure detection process, the second failure detection process and the memory manipulation process are included in A task 61, B task 62 and C task 63, respectively. The memory manipulation process is provided for storing failure information in memory areas. The memory areas are allocated for the respective pieces of the failure information by the bit.

Figure 3:
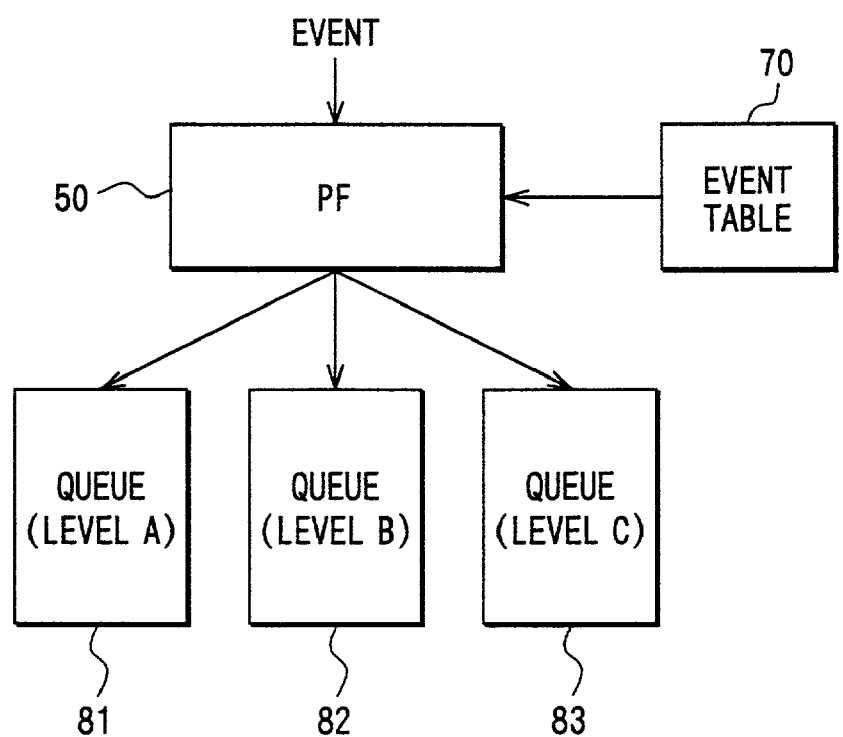
FIG. 3 is a block diagram showing an event table and queues used for execution of the engine control program.

Referring to FIGS. 2 and 3, when the PF 50 detects occurrence of an event, it identifies the task 61, 62, 63 that includes an event process corresponding to the detected event by referring to an event table 70. The occurrence of the event is detected based on, for example, the signals from the sensors 30. Further the occurrence of the event may be detected based on the value of the free running counter in the microcomputer 10, or based on information provided by a process on execution.

The platform 50 stores a request for execution of the event process in the queue 81, 82, 83 corresponding to the identified task 61, 62, 63. That is, if the identified task is A task 61, the request is stored in the queue 81 which is provided for storing requests for execution of processes of level A. Each of the queues 81, 82, 83 is a FIFO (first-in first-out) queue, which is a buffer from which the requests are retrieved in the same order they were stored. Each of the stored requests may include data required for execution of the event process.

The RTOS 51 identifies the task 61, 62, 63 to be activated by referring to the queues 81, 82, 83, and activates the identified task 61, 62, 63. The RTOS 51 further passes the required data, which is included in the request stored in the queue 81, 82, 83, to the activated task 61, 62, 63. Then the activated task 61, 62, 63 executes the event process.

Each of the first and second failure detection processes generates an event for instructing memory manipulation during execution of the process, when the memory manipulation should be performed. The event for instructing memory manipulation includes ID of the requester process that has generated the event. The PF 50 detects the generated event. Then the PF 50 stores a request for memory manipulation in the queue 83 of level C as a result of reference to the event table 70 as described above, because the memory manipulation process belongs to C task 63.

Figure 4A:
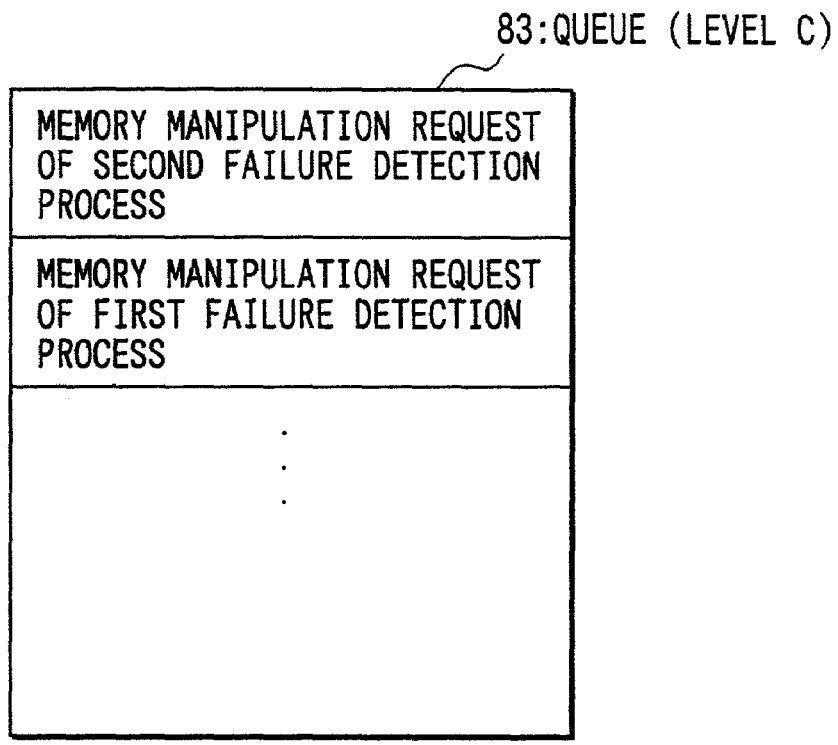
FIG. 4A is a schematic diagram showing how memory manipulation requests are stored in the queue of level C.

In the case that the second failure detection process generates an event for instructing memory manipulation and thereafter the first failure detection process generates an event for instructing memory manipulation, memory manipulation requests corresponding to the generated events are stored in the queue 83 of level C as shown in FIG. 4A. The memory manipulation requests stored in the queue 83 include the IDs of the second failure detection process and the first failure detection process, respectively.

If C task 63 is not active but should be activated, the RTOS 51 activates C task 63 only when higher priority tasks 61, 62 are not active and not required to be activated. When C task 63 is activated, the RTOS 51 retrieves requests one by one from the queue 83 and passes, as parameters, the data included in the request to C task 63. Then C task 63 executes the requested process using the received parameters. Therefore, if execution of the memory manipulation process is requested, C task 63 executes the memory manipulation process using the received parameters.

Specifically, the memory manipulation process first identifies the failure detection process that has requested the memory manipulation based on the ID received as one of the parameters. Then memory manipulation process further identifies the memory area to be manipulated based on the identified failure detection process. Thereafter the memory manipulation process reads data from the identified memory area by the byte. Then the memory manipulation process sets or resets a specific bit of the retrieved byte data, and writes the resultant data to the memory area.

Thus failure information for which memory areas are allocated by the bit is manipulated by the byte. The memory manipulation process may receive, as some of the parameters, information on the position of the specific bit to be set or reset and whether the specific bit should be set or reset.

Figure 4B:
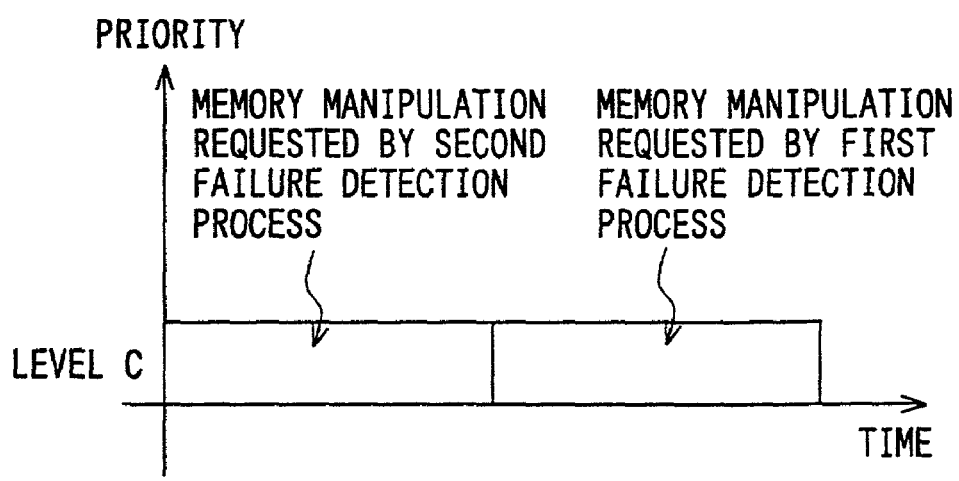
FIG. 4B is a graph showing the order in which the memory manipulation requests shown in FIG. 4A are handled according to the embodiment of the present invention.
Figure 5:
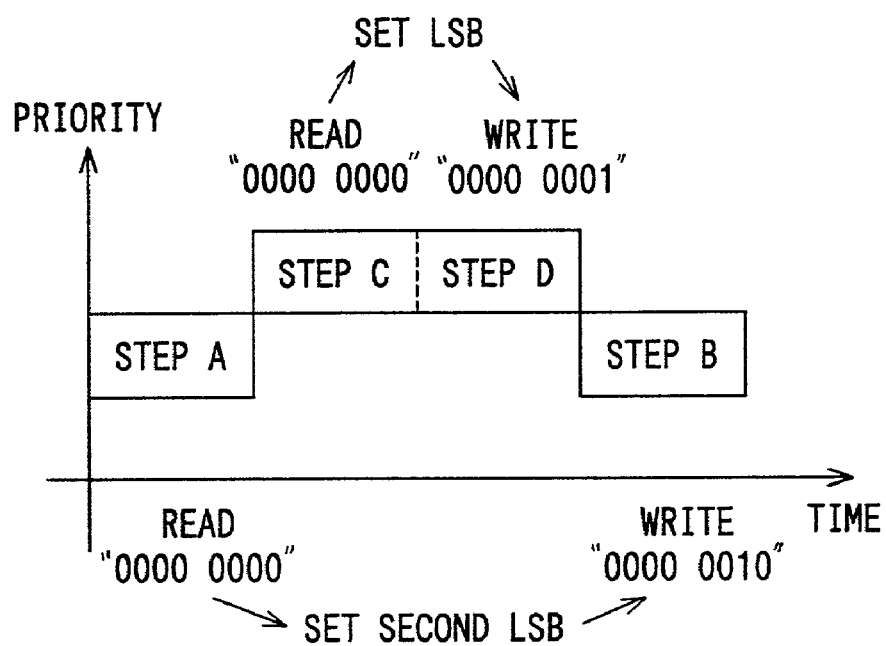
FIG. 5 is a graph showing how processes of different priority levels interfere with each other when memory manipulation is performed according to related art.

In the case that the memory manipulation requests are stored in the queue 83 as shown in FIG. 4A, memory manipulation requested by the second failure detection process of level B is first performed, and thereafter memory manipulation requested by the first failure detection process of level A is performed as shown in FIG. 4B. Thus memory manipulation is performed by the memory manipulation process in the same order as it is requested irrespective of the priority levels of the failure detection processes that have requested the memory manipulation.

The engine control program may be provided as a computer readable medium such as FD, MO, CD-ROM, DVD, or a hard disk which stores it. In this case, the engine control program is loaded from the computer readable medium into the RAM 13, and then executed. Further the engine control program may be provided as a computer readable medium such as ROM or backup RAM which stores it. In this case, the computer readable medium is incorporated in the ECU 1.

According to the present embodiment, the following advantages are provided. Execution of memory manipulation requested by a process is not interrupted by execution of memory manipulation requested by another process, because the memory manipulation process of a specific priority level is provided dedicatedly for performing memory manipulation. However, processes belonging to A task 61 or B task 62 may be executed interrupting execution of the memory manipulation process, because the memory manipulation process has a priority level of C. That is, higher priority processes can be executed in real time.

Further in the present embodiment, the processor unit according to the present invention is employed for execution of the failure detection program in the ECU 1. In this case, if memory areas are allocated for storing the respective pieces of failure information by the bit and a RISC computer, which manipulates data by the byte, is employed as the ECU 1, there is every possibility that a plurality of process manipulate the same memory area as described above. Therefore the processor unit according to the present invention is effective especially in this case. In other words, the employment of the present processor unit for execution of the failure detection program enables employment of the RISC computer as the ECU 1.

According to the present embodiment, each of the memory manipulation requests includes the ID of the requester process that has requested the memory manipulation, and the memory manipulation process receives the ID as one of the parameters from the RTOS 51. Therefore, based on the received ID, the memory manipulation process can identify the requester failure detection process and further the memory area to be manipulated. Accordingly, one memory manipulation process can be shared by both the failure detection processes in this case. That is, dedicated memory manipulation processes are not required for the respective failure detection processes. As a result, the entire engine control program can be compact.

The engine control program corresponds to a program of the present invention. The event generated by the failure detection processes for instructing memory manipulation corresponds to a memory manipulation instruction, and the ID included in the event corresponds to identification information on a requester process.

(Modifications)

In the above embodiment, the memory manipulation process may be included in B task 62 or A task 61 instead of C task 63. In this case, the memory manipulation is performed in the same order as it is requested similarly to the above embodiment.

In the above embodiment, the PF 50 may sort the memory manipulation requests stored in the queue 83 of level C into preferential order based on a predetermined criterion, so that memory manipulation that should be performed in real time may be preferentially performed.

Further in the above embodiment, dedicated memory manipulation processes may be prepared for the respective failure detection processes. In this case, each of the memory manipulation requests is not required to include the ID of the requester process.

The present invention is not limited to the above embodiment and modifications, but may be variously embodied within the scope of the invention.

What is claimed is:

1. A processor unit for implementing a series of functions comprising a program for implementing said series of functions, said program comprising a plurality of at least three processes,
    wherein said program is executed by switching between said plurality of at least three processes based on priority levels assigned to individual ones of said plurality of at least three processes, and at least two processes of different respective priority levels manipulate a common memory area,
    wherein said program includes a memory manipulation process for implementing memory read/write operations as one of said plurality of at least three processes,
    wherein each of said plurality of at least three processes except said memory manipulation process requests memory manipulation by giving a memory read/write instruction as a need arises during execution of said program, and said memory manipulation process performs the requested memory manipulation in response to said instruction when activated,
    wherein a specific priority level is assigned to said memory manipulation process so that execution of memory manipulation requested by a first process is not interrupted by execution of memory manipulation requested by a second process irrespective of priority levels of said first and second processes, and
    wherein said instruction includes identification information for identifying a process that requests the memory manipulation.

2. A processor unit as in claim 1, wherein the requested memory manipulations are performed by said memory manipulation process in the same order as they are requested by other processes.

3. A processor unit as in claim 1,
    wherein said series of functions is provided for failure diagnosis in an on-vehicle device, and wherein said memory manipulation process performs the requested memory manipulation on failure diagnosis information.

4. A processor unit as in claim 3,
wherein memory is allocated for respective pieces of said failure diagnosis information on a bit-by-bit basis, and
wherein said memory manipulation process manipulates said failure diagnosis information stored in said common memory area on a byte basis.

5. A processor unit as in claim 1, wherein said memory manipulation process identifies a requester process based on said identification information, and further identifies a portion of the memory area that corresponds to the identified requester.

6. A stored program medium containing a computer program for implementing a series of functions comprising a plurality of processes,
wherein said program is executed by switching between said plurality of processes based on priority levels assigned to individual ones of said plurality of processes, and at least two processes of different respective priority levels manipulate a common memory area,
wherein said program includes a memory manipulation process for implementing memory read/write operations as one of said plurality of processes,
wherein each of said plurality of processes except said memory manipulation process requests memory manipulation by giving a memory read/write instruction as a need arises during execution of said program, and said memory manipulation process performs the requested memory manipulation in response to said instruction when activated, and
wherein a priority level is assigned to said memory manipulation process so that execution of memory manipulation requested by a first process is not interrupted by execution of memory manipulation requested by a second process irrespective of priority levels of said first and second processes, and
wherein said instruction includes identification information for identifying the process that requests the memory manipulation.

7. A processor unit executes a plurality of processes implementing a series of functions, wherein each of the plurality processes is assigned a priority level, and is executed based on the assigned priority level, the processor unit comprising:
at least a first and a second process included in the plurality of processes.
wherein the first process has a first priority level and the second process has a second priority level different from the first priority level, and
wherein each of the at least two processes provides, while being executed, a memory manipulation instruction requesting a memory read/write operation in an area of memory; and
a third process is included in the plurality of processes and has a third priority level lower than both the first priority level and the second priority level, wherein the third process performs the requested memory manipulation during its execution based on the third priority level independently of the priority level of the requester, and
wherein the memory manipulation instruction of includes identification information.

8. A processor unit as in claim 7,
wherein requested memory manipulations are performed by the third process in the same order as they were requested.

9. A processor unit as in claim 7,
wherein the series of functions is provided for failure diagnosis in an on-vehicle device, and
wherein the third process performs requested memory manipulation of failure diagnosis information based on a memory manipulation instruction given by a requester.

10. A processor unit as in claim 9,
wherein the memory area allocated for respective pieces of the failure information is on a bit-by-bit basis,
wherein the third process manipulates the failure diagnosis information stored in the memory area on a byte-by-byte basis.

11. A processor unit as in claim 7,
wherein the third process identifies the requester process based on the identification information, and further identifies a portion of memory area that corresponds to the identified requester and is to be manipulated.

12. A computer program product in a computer-readable medium for use in implementing a series of functions using a program including a plurality of processes, wherein each of the plurality of processes is assigned a priority level, and is executed based on the assigned priority level, the computer program product comprising:
at least a first process and a second process that are included in the plurality of processes,
wherein the first process has a first priority level and the second process has a second priority level different from the first priority level, and
wherein each of the at least two processes provides, while being executed, a memory manipulation instruction requesting a memory read/write operation in an area of memory; and
a third process is included in the plurality of processes and has a third priority level lower than both the first priority level and the second priority level,
wherein the third process performs the requested memory manipulation during its execution based on the third priority level independently of the priority level of the requester, and
wherein the memory manipulation instructin includes identification information.

* * * * *